United States Patent
Shekels et al.

(10) Patent No.: US 12,539,626 B2
(45) Date of Patent: Feb. 3, 2026

(54) PICK AND PLACE ROBOT WITH INVENTORY DROP GUARD

(71) Applicant: Nimble Robotics, Inc., San Francisco, CA (US)

(72) Inventors: Matthew Shekels, Daly City, CA (US); Simon Kalouche, San Francisco, CA (US)

(73) Assignee: Nimble Robotics, Inc., San Francisco, CA (US)

( * ) Notice: Subject to any disclaimer, the term of this patent is extended or adjusted under 35 U.S.C. 154(b) by 260 days.

(21) Appl. No.: 18/328,069

(22) Filed: Jun. 2, 2023

(65) Prior Publication Data

US 2023/0398704 A1    Dec. 14, 2023

Related U.S. Application Data

(60) Provisional application No. 63/350,194, filed on Jun. 8, 2022.

(51) Int. Cl.
| | |
|---|---|
| *B25J 19/06* | (2006.01) |
| *B25J 5/02* | (2006.01) |
| *B25J 9/16* | (2006.01) |

(52) U.S. Cl.
CPC .............. *B25J 19/066* (2013.01); *B25J 5/02* (2013.01); *B25J 9/1679* (2013.01)

(58) Field of Classification Search
CPC ........... B25J 19/066; B25J 5/02; B25J 9/1679
USPC ........................................... 318/563
See application file for complete search history.

(56) References Cited

U.S. PATENT DOCUMENTS

2018/0319590 A1\* 11/2018 Lindbo ................ B65D 83/768
2021/0032034 A1\* 2/2021 Kalouche ............... B25J 9/1612

\* cited by examiner

*Primary Examiner* — Kawing Chan
(74) *Attorney, Agent, or Firm* — POLSINELLI PC

(57) ABSTRACT

A mobile robot provided with a drop guard. The robot includes a body coupled to a wheel assembly having a plurality of wheels and a drive mechanism arranged to move the body about a top of a storage frame along a first set of parallel rails extending in a first direction and a second set of parallel rails extending in a second direction perpendicular to the first direction. The robot includes a picking arm equipped with an end effector for picking items from a storage container and a drop guard secured to the body. The guard is movable from a stowed condition to an expanded condition to prevent items from falling within the storage frame.

20 Claims, 7 Drawing Sheets

PICK AND PLACE ROBOT WITH INVENTORY DROP GUARD

CROSS-REFERENCE TO RELATED APPLICATIONS

This application claims the benefit of the filing date of U.S. Provisional Patent Application No. 63/350,194 filed Jun. 8, 2022, the disclosure of which is hereby incorporated herein by reference.

BACKGROUND OF THE INVENTION

The present disclosure relates generally to robotic storage and retrieval systems, and more particularly, to mobile manipulator robots for retrieving inventory items.

Warehouses, or distribution fulfillment centers, require systems that enable the efficient storage and retrieval of many diverse products. Traditionally, inventory items are stored in containers and arranged on rows of shelving on either side of an aisle. Each container holds a plurality of items of one or more product types. The aisles provide access between the shelving for an operator or robot to migrate the aisles and retrieve the items. It is well understood, however, that the aisles reduce the storage density of the system. In other words, the amount of space used for the storage of products (e.g., the shelving) is relatively small compared to the amount of space required for the storage system as a whole. As warehouse space is often scarce and expensive, alternative storage systems that maximize storage space are desired.

In one alternative approach, which offers a significant improvement in storage density, containers are stacked on top of one another and arranged in adjacent rows. That is, no aisle is provided between the adjacent rows of stacked containers. In turn, more inventory can be stored in a given space.

Various methods for retrieving inventory from the stacked containers have been contemplated. U.S. Pat. Pub. No. 2021/0032034, which is incorporated herein by reference in its entirety, discloses a system in which containers are stacked and arranged in a plurality of rows underneath a grid. Robots equipped with a picking arm and/or a lifting apparatus navigate the grid, extract containers when necessary, and then pick and pack the items into order containers.

Despite the improved storage density offered by the stacked storage system, the system is not without shortcomings. For example, if an item is inadvertently dropped by the robot before the item is packed, the item may fall beneath the grid to a location in which the item cannot be retrieved without human intervention.

BRIEF SUMMARY

In accordance with a first aspect of the present disclosure, a robot with an inventory drop guard is provided. Among other advantages, the drop guard is expandable to prevent unintentionally dropped items from failing to a location where the item cannot be retrieved, and collapsible so as to not impede the movement of robots located on adjacent grid spaces.

In one aspect, a robot includes a body: coupled to a wheel assembly, the wheel assembly including a plurality of wheels and a drive mechanism arranged to move the body along a first set of parallel rails extending in a first direction and a second set of parallel rails extending in a second direction perpendicular to the first direction; a picking arm having an end effector for picking items from a storage container; and at least one drop guard movable from a stowed condition to an expanded condition.

When the at least one drop guard is in the stowed condition, a free end of the at least one drop guard may extend a first distance from the body, and when the at least one drop guard is in the expanded condition, the free end of the at least one drop guard may extend a second distance from the body greater than the first distance.

When the at least one drop guard is in the stowed condition, the free end of the at least one drop guard may extend a third distance above the wheel assembly, and when the at least one drop guard is in the expanded condition, the free end of the at least one drop guard may extend a fourth distance above the wheel assembly, whereby the fourth distance may be greater than the third distance.

The at least one drop guard may include a first drop guard located on a first side of the body and a second drop guard located on a second side of the body opposite the first side of the body.

The first drop guard may be actuatable independent of the second drop guard.

The at least one drop guard may include a covering arranged to capture dropped items.

The at least one drop guard may be pneumatically actuated between the stowed condition and the expanded condition.

In another aspect, a system includes: a storage frame including pillars defining shafts, the pillars supporting a first set of a parallel rails extending in a first direction and a second set of parallel rails extending in a second direction perpendicular to the first direction, the first and second sets of parallel rails collectively defining a plurality of grid spaces; containers stacked upon one another to form a plurality of vertical stacks, each vertical stack being arranged within a respective shaft and within a footprint of a respective one of the plurality of grid spaces; and a robot including: a body coupled to a wheel assembly, the wheel assembly including a plurality of wheels and a drive mechanism arranged to move the body along the first set of parallel rails and the second set of parallel rails; a picking arm equipped with an end effector for picking items from one of the containers; and a drop guard movable from a stowed condition to an expanded condition.

A dimension of the containers may be smaller than a dimension of the shafts such that a gap exists between the vertical stacks and the pillars.

The robot may further include a grapple sized to descend within gap and arranged to secure and lift a container.

The grapple may be coupled to a winding mechanism provided on a pair of support arms, and the drop guard may extend along a side of the body and one of the support arms.

When drop guard is in the expanded condition, a terminal end of the drop guard may extend above the gap of a grid space adjacent to the robot.

When the drop guard is in the stowed condition, a terminal end of the drop guard may not extend above an adjacent grid space.

The drop guard may be pivotable between the stowed condition and the expanded condition.

The frame may include a supply line arranged to provide the robot with an external pneumatic supply.

A valve may be housed within at least one of the first set of parallel rails or the second set of parallel rails, and the valve may be transitionable between a closed condition in which the external pneumatic supply is confined within the supply line and an open condition in which the external pneumatic supply is accessible by the robot.

The robot may further include a coupler arranged to selectively access the external pneumatic supply.

The robot may further include a high-pressured air tank configured to store compressed air received from the pneumatic supply line at or above approximately 3000 psi.

The drop guard may be pneumatically actuated.

In yet another aspect, a system includes: a storage frame including pillars defining shafts, the pillars supporting a first set of a parallel rails extending in a first direction and a second set of parallel rails extending in a second direction perpendicular to the first direction, the first and second sets of parallel rails collectively defining a grid having a plurality of grid spaces, the grid being configured to support a mobile manipulator robot; containers stacked upon one another to form a plurality of vertical stacks, each vertical stack being arranged within a footprint of a respective one of the plurality of grid spaces such that a gap exists between a respective vertical stack and the pillars defining the respective one of the plurality of grid spaces; and a drop guard coupled to the storage frame, the drop guard being transitionable between a collapsed condition in which the gap is exposed and an expanded condition in which the gap is covered from above.

DETAILED DESCRIPTION

As used herein, when terms of orientation, for example, "vertical" and "horizontal" or relative terms such as, "above," "upwards," "beneath," "downwards" and the like are used to describe the orientation or relative position of specific features of the storage structure or the mobile robot, the terms are in reference to the orientation or the relative position of the features in the normal gravitational frame of reference when the storage structure is resting on a ground surface. Also as used herein, the terms "substantially," "generally," "about" and the like are intended to mean that slight deviations from absolute are included within the scope of the term so modified.

Figure 1A:
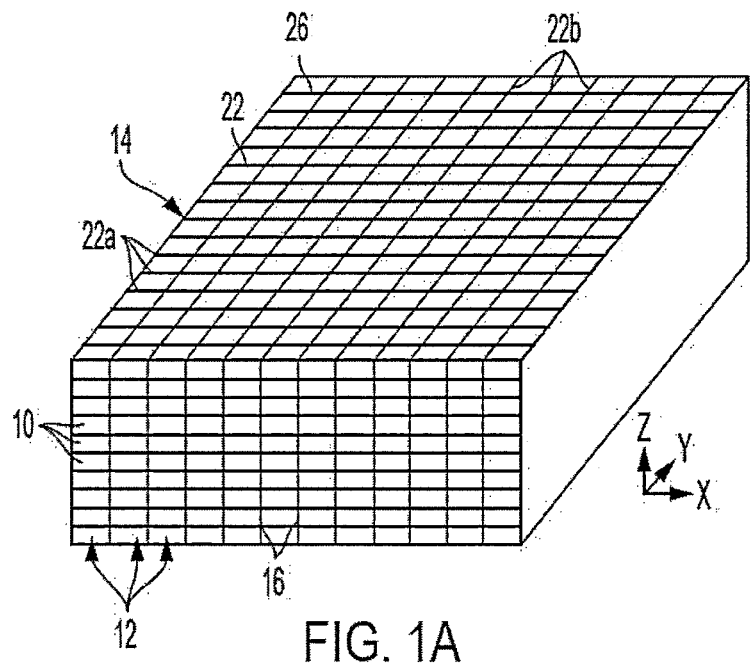
FIG. 1A is a schematic perspective view of a storage frame for housing a plurality of stacked containers.
Figure 1B:
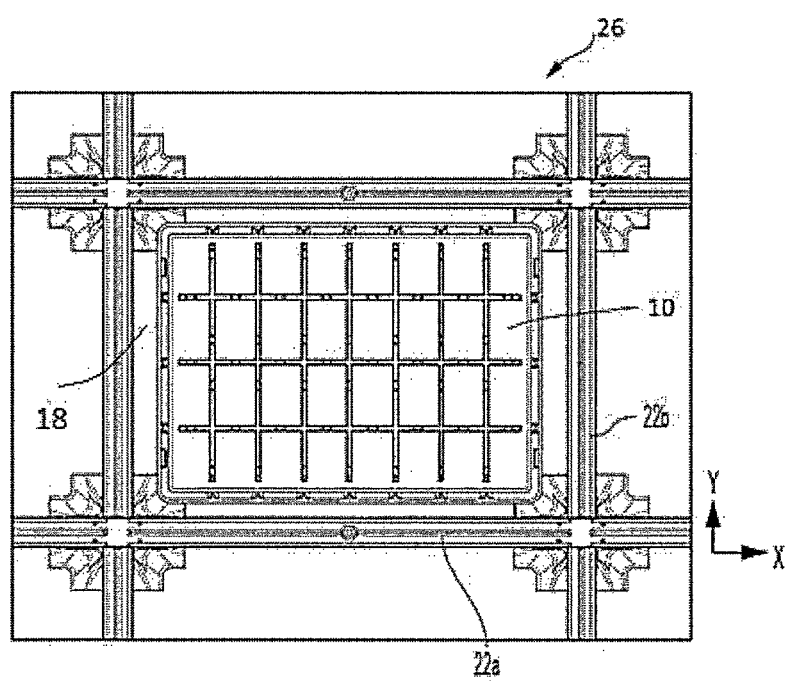
FIG. 1B is a top elevation view of a portion of the frame of FIG. 1A.

FIGS. 1A and 1B illustrate a storage structure for efficiently storing a plurality of stackable containers 10 according to an embodiment of the present disclosure. Each container 10 typically holds a plurality of product items (not shown) of identical or different product types. Containers 10 are designed to nest within an upper surface (i.e., rim) of another container to form stacks 12 that can be arranged in a frame 14.

Frame 14 includes pillars 16 and a series of rails 22 arranged in a grid-like pattern at an uppermost level of the frame. For this reason, rails 22 are collectively referred to as a grid 26 which defines a plurality of "grid spaces." Pillars 16 form shafts within which stacks 12 are housed. As a result, each stack 12 is located within the footprint of a respective grid space (e.g., longitudinally underneath the respective grid space). FIG. 1B is a top elevation view of a single grid space. As shown in FIG. 1B, the cross-sectional area of each shaft is slightly larger than the outer dimensions of containers 10 such that a small gap 18 of space exists between the outer surface of the containers and pillars 16.

Figure 2A:
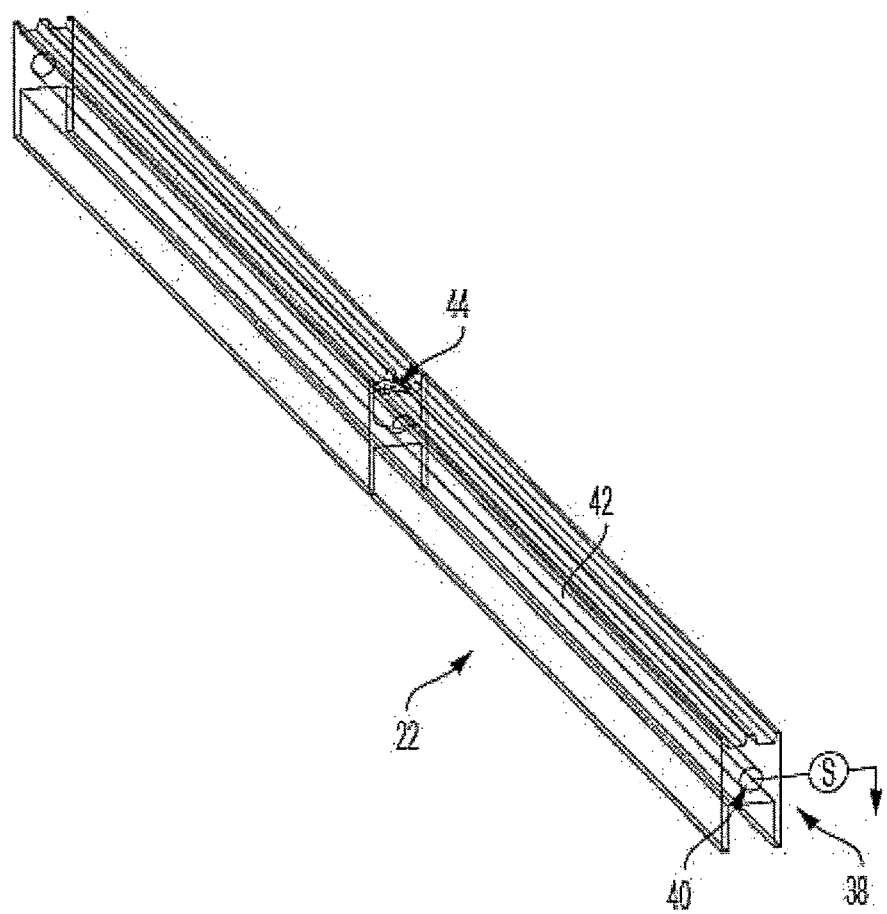
FIG. 2A is a perspective view of a rail illustrating a pneumatic supply channel extending through the rail and a conduit extending from the channel to a surface of the rail.
Figure 2B:
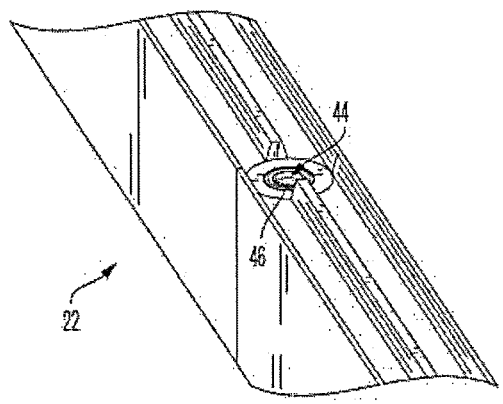
FIG. 2B is an enlarged view of a portion of the rail of FIG. 2A.
Figure 2C:
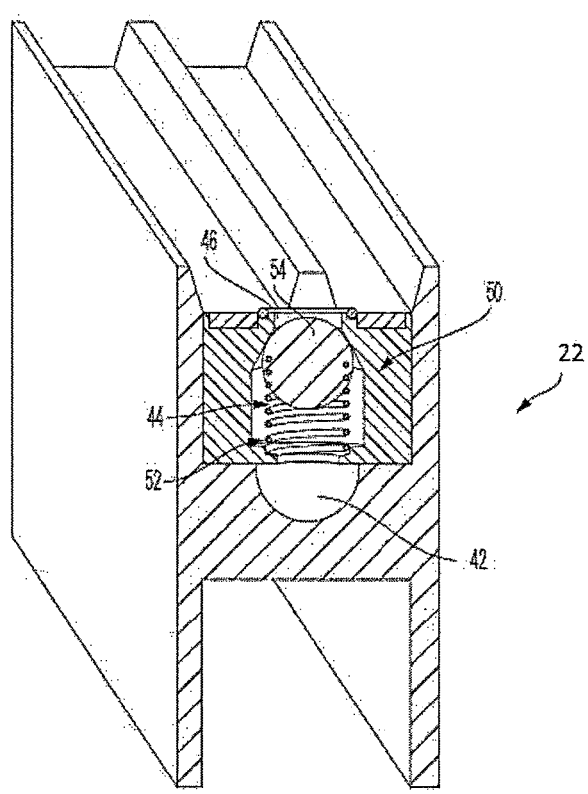
FIG. 2C is a cross-section view of a valve located within the conduit of FIG. 2A.

With additional reference to FIGS. 2A-2C, each rail 22 may be extruded from a metal or metal alloy and formed with a double u-shaped track. The track provides a drive surface for robots 100 (shown in FIG. 3A) to move about grid 26 while fulfilling orders. A first set of parallel rails 22a guides movement of robots 100 in a first direction (e.g., the X-direction), and a second set of parallel rails 22b, arranged perpendicular to the first set of parallel rails, guides movement of the robots in a second direction (e.g., the Y-direction). In this manner, rails 22 allow robot 100 to move laterally in two directions (in the X-direction and in the Y-direction) across the top of frame 14 such that the robots can be moved into position above any one of the stacks 12 of containers 10.

In some embodiments, frame 14 may include a pneumatic system 38 accessible by robots 100 when the robots are installed on grid 26. In this regard, each robot 100 can access an external pneumatic supply when operating one or more of its pneumatically actuated components, for example, a pneumatically actuated end effector such as a suction cup. Robots 100 thus do not need to be tethered to an external pneumatic source nor do the robots need to carry a pneumatic source "onboard" in order to operate its pneumatic components. As used herein, the term "onboard" means a feature secured within or otherwise coupled to the robot. Pneumatic system 38 thus provides robots 100 with greater flexibility as air compressors and other pneumatic sources capable of producing a pressure great enough to effectively operate a gripping tool, such as a suction cup, are necessarily bulky and prohibitively large to be carried onboard by a robot operating on grid 26.

Pneumatic system 38 includes a pneumatic source S configured to generate and supply compressed air to a supply line 40 and, in turn, to robots 100. Supply line 40 includes a series of channels 42, conduits 44 and ports 46. As shown in FIG. 2A, channels 42 may extend in a length direction of a respective rail 22 while conduits 44 extend between the channel and a port 46 located at an upper surface of the rail, thereby allowing robot 100 to selectively access the external pneumatic supply. Ports 46 may be located about each grid space and/or only at select locations of grid 26, for example, about the perimeter of the grid. With specific reference to FIG. 2C, each conduit 44 houses a valve 50 designed to selectively plug port 46. In other words, valve 50 is transitionable between a closed condition in which compressed air is contained within supply line 40 and an open condition in which the compressed air exits port 46 and is accessible by robot 100.

As shown in FIG. 2C, each valve 50 includes a spring 52 and a plug 54 for sealing port 46. When spring 52 is in an extended configuration, the spring biases plug 54 into engagement with port 46, which seals the port and contains the compressed air within supply line 40. On the other hand, when plug 54 is pushed away from port 46, the spring compresses, and the compressed air flows around the plug and through the port to robot 100. Valves having a different construction may alternatively be used. For example, the valve may be constructed as any passively or actively actuated valve, such as an electrohydraulic servo valve, capable of selectively confining compressed air within supply line 40. Moreover, while supply line 40 is primarily described herein as extending through rails 22, it will be appreciated that the supply line may additionally, or alternatively, extend at least partially through pillars 16, be attached to or otherwise coupled to an external surface of frame 14, or otherwise be in close proximity to the rails so long as the robots 100 can access the external pneumatic supply when the robots are positioned on grid 26.

Figure 3A:
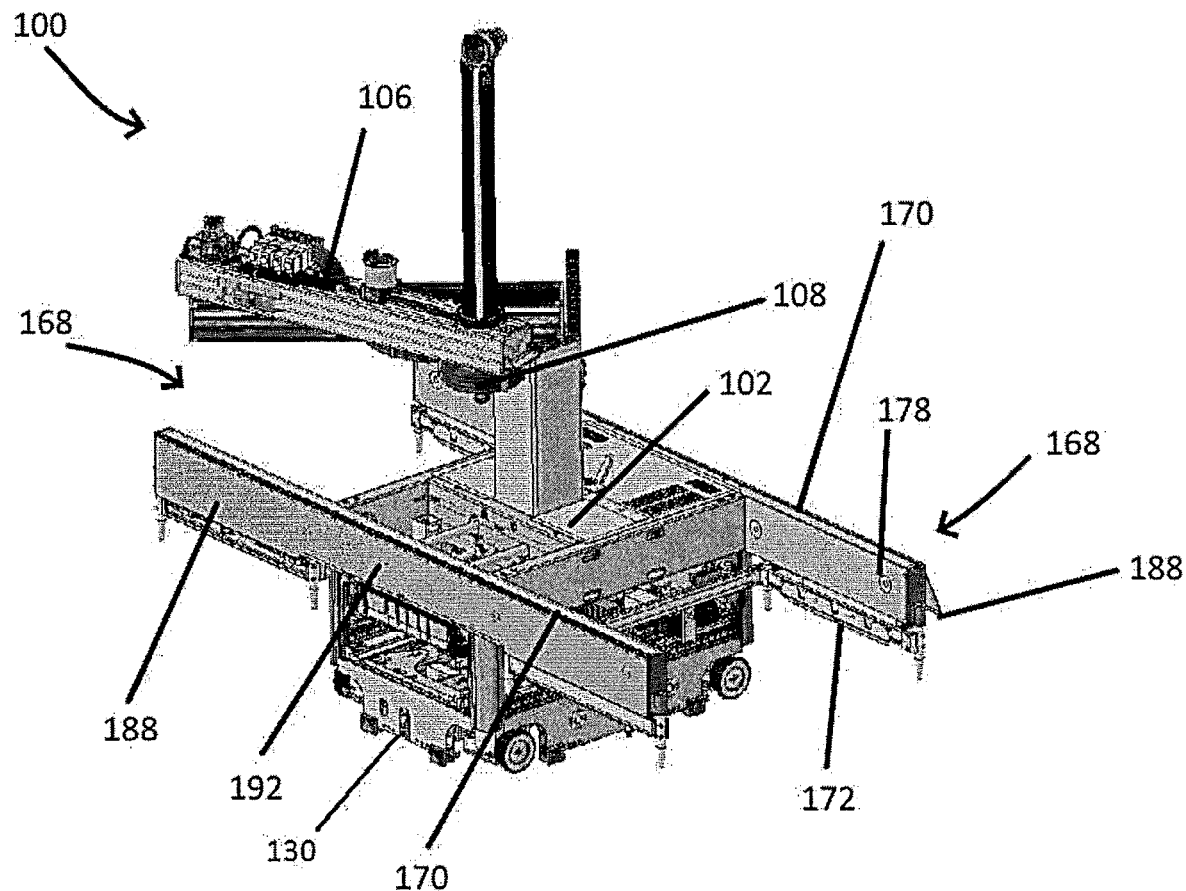
FIG. 3A is a perspective view of a robot including a picking arm, two container retrieval devices, and drop guards installed on top of the frame of FIG. 1A.

Robots 100 includes a communication interface to send and receive data between the robot and a remote computer, such as a Warehouse Management System (WMS), enabling the remote computer to control movement and operation of each of the robots about grid 26. Turning now to FIG. 3A, robot 100 includes a body 102 and a wheel assembly 104 configured to guide movement of the body about rails 22. Wheel assembly 104 may include a plurality of wheels, a motor, and one or more transmissions (belts or linkages) operably coupling each one of the wheels to the motor. The orientation of the wheels is controlled by the motor and the one or more transmissions. More specifically, the motor is coupled to each one of the wheels, via the one or more transmissions, such that rotation of the motor simultaneously pivots the orientation of each one of the wheels. In this regard, the wheels may be concurrently pivoted between a first orientation in which each of the wheels is aligned with the first set of parallel rails 22a and a second orientation in which each of the wheels is aligned with the second set of parallel rails 22b (e.g., 90 degrees). A drive mechanism is associated with wheel assembly 104 to rotate the wheels and move body 102 along the rails in which the wheels are positioned. In one example, the drive mechanism may be a direct drive, or a quasi-direct drive, actuator (e.g., motor) with diametrically polarized magnets coupled to each rotor and a magnetic encoder configured to read the diametrically polarized magnetic field and determine the angle of each wheel. The motor may be provided within, or be otherwise coupled to, each wheel hub.

Alternatively, the wheel assembly 104 may include first set of wheels, consisting of a pair of wheels on the front of body 102 and a pair of wheels on the back of the body, that is arranged to engage with two adjacent rails 22a, and a second set of wheels 36, consisting of a pair of wheels on each lateral side of the body, that is arranged to engage with two adjacent rails 22b. Each set of wheels can be lifted and lowered, so that either the first set of wheels or the second set of wheels is engaged with the respective set of rails 22a, 22b depending on the desired direction of movement of robot 100.

Robot 100 also includes a picking arm 106 equipped with an end effector 108 for picking and packing inventory items. End effector 108 may be a suction cup or another pneumatically actuated gripping tool. In embodiments in which end effector 108 is pneumatically actuated, robot 100 may also include a coupler 130 arranged to access compressed air from supply line 40. Coupler 130 is a generally hollow tube configured to receive compressed air from supply line 40 when valve 50 is in the open condition. Coupler 130 may include a mechanical, electrical or magnetic device for actively transitioning the valve between the closed and open conditions. When end effector 108 is a suction cup, a Venturi pump is placed downstream of coupler 130 and upstream of the suction cup to convert the compressed air received from supply line 40 into a suction force. In some instances, robot 100 may optionally carry a high pressured, refillable air tank, such as a scuba tank, capable of storing compressed air at or above 3000 psi. It will be appreciated that when robot 100 includes a high-pressured air tank, the robot does not need to engage coupler 130 with valve 50 each time the robot operates its pneumatically actuated components. Instead, robot 100 may refill the air tank when necessary and use the stored pneumatic supply to operate its pneumatic end effector, or other pneumatic features, as desired until the high-pressured air tank is empty. Of course, coupler 130, the Venturi pump, and the high-pressured air tank would not be necessary if end effector 108 is not pneumatically actuated.

With continued reference to FIG. 3A, the body 102 of robot 100 may also include one or more container retrieval devices 168 for extracting containers 10 from a desired stack 12 and/or for securing an order container to the body of the robot. When it is necessary to distinguish between containers storing product items from which items are picked, and containers into which the picked items are packed, the term "storage container" will be used to identify containers from which items are picked and the term "order container" will be used to identify containers into which the picked items are packed. Nevertheless, the storage containers and the order containers may have the same structure. As shown in FIG. 3A, robot 100 includes two container retrieval devices 168: a first container retrieval device at a front of body 102 and a second container retrieval device at a back of the body. However, it is contemplated that robot 100 may include zero, one, two, three or four container retrieval devices 168 and that the container retrieval devices may be arranged about 102 in any arrangement.

Each container retrieval device 168 includes a pair of support arms 170 and a grapple 172 designed to extract storage containers from frame 14 and/or secure order containers to the body 102 of robot 100. Grapple 172 is suspended from support arms 170 by cables (not shown) which are connected to a winding mechanism 178 such as a spool, hoist, or winch. The cables can thus be wound and unwound to adjust the height of grapple 172 with respect to the support arms in the z-direction.

Figure 3B:
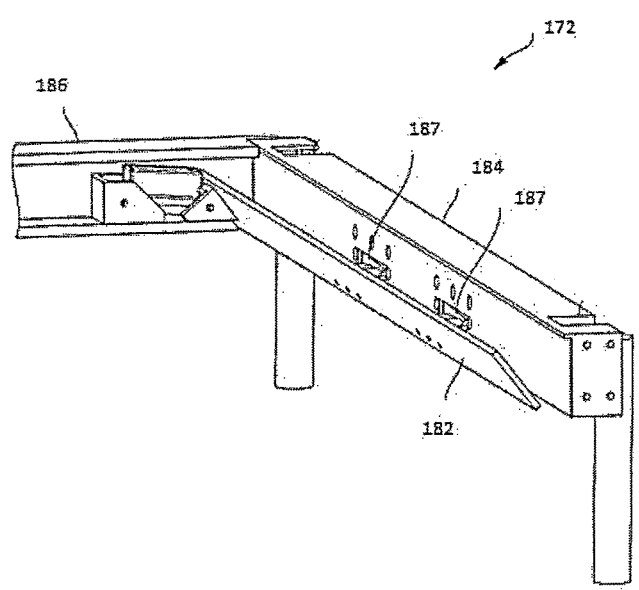
FIG. 3B is perspective view of a portion of a grapple of the container retrieval device of FIG. 3A.

With additional reference to FIG. 3B, grapple 172 includes a three-sided grapple frame 180 and pivotable flaps 182. The three sides of grapple frame 180 are formed by opposing grapple arms 184 and a connector 186. Grapple arms 184 and connector 186 collectively define an aperture. Each flap 182 is pivotable relative to a respective grapple arm 184 between a deployed configuration in which the flap extends away from the grapple arm and into the aperture and an undeployed configuration in which the flap lies substantially flush against the grapple arm. Movement of flaps 182 between the undeployed and deployed configurations may be controlled by an actuator 187 disposed within grapple 172 and configured to convert an electrical signal carried through cables to rotational motion of the flaps. When flaps 182 are in the undeployed configuration, the aperture is larger than containers 10, allowing grapple 172 to be lowered into gap 18, and around a stack 12 of containers, before the flaps are deployed and brought into engagement with an engagement feature such as a rib (not shown) on a side of the container. In this manner, container retrieval device 168 is arranged to extract multiple containers 10 in a single lift. Put differently, container retrieval device 168 is designed to lift the container 10 secured to grapple 172 and each of the containers stacked on top of that container to a location above grid 26 in a single lift.

Although the combination of gap 18 and grapple 172 advantageously allows robot 100 to lift multiple containers in a single lift, the gap is not without drawbacks. For example, items that are picked from a storage container may be unintentionally dropped before the item is packed into an order container. If the dropped item falls into gap 18, the item may descend within the shaft to a location where it cannot be retrieved by robot 100.

To prevent items from falling into gap 18, robot 100 includes one or more collapsible and expandable drop guards 188 configured to deflect or catch dropped items. It will be appreciated that items deflected and/or caught by drop guard 188 may be subsequently picked-up by the end effector 108 of robot 100 and then packed into an order container.

Figure 4A:
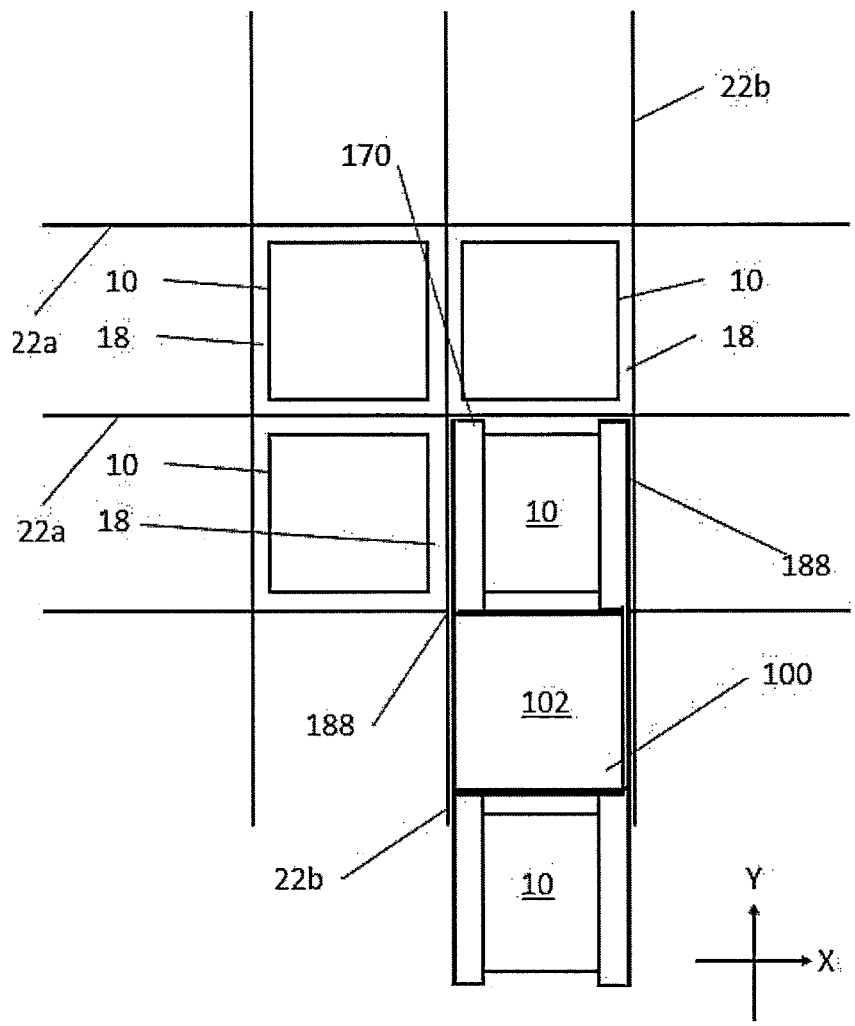
FIG. 4A is schematic, top elevation view illustrating the drop guards of the robot of FIG. 3A in a stowed condition.
Figure 4B:
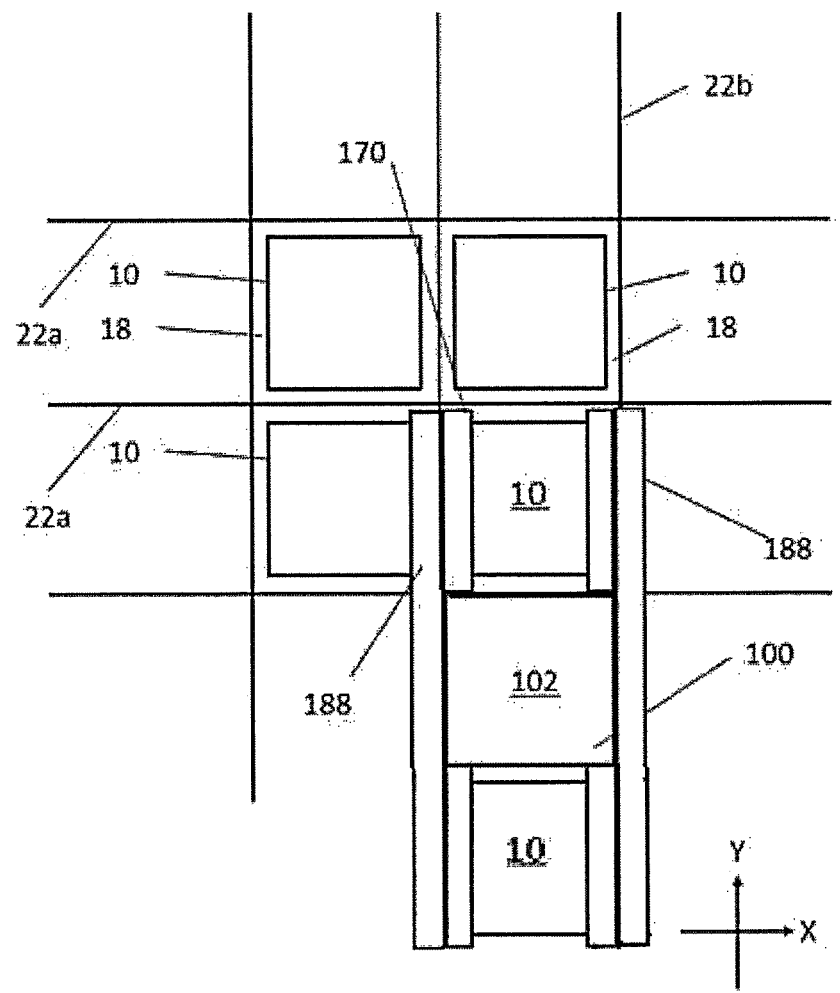
FIG. 4B is schematic, top elevation view illustrating the drop guards of the robot of FIG. 3A in an expanded condition.

In one example, as is schematically shown in FIGS. 4A and 4B, a first drop guard may be coupled about a first side of body 102 and a second drop guard may be coupled about a second side of the body. Each of the drop guards 188 is moveable between a stowed (e.g., collapsed) condition (shown in FIG. 4A) in which the drop guard lies substantially adjacent to or within body 102, and an expanded condition (FIG. 4B), in which the drop guard extends laterally away from the body.

Referring to FIG. 4A, when drop guard 188 is in the stowed condition, no portion of the drop guard extends above a grid space that is located lateral to the grid spaces upon which robot 100 is positioned. Thus, when drop guard 188 is in the stowed condition, the drop guard does not interfere with another robot positioned on or traversing the adjacent grid spaces. On the other hand, when the drop guard 188 is in the expanded condition as shown in FIG. 4B, the drop guard extends over gap 18 of the grid space(s) located lateral to the grid spaces upon which robot 100 is positioned and prevents an item from falling into the gap during a picking task. As shown in FIG. 3A, the first and second drop guards 188 may be independently actuatable between their respective stowed and expanded conditions. For example, if picking arm 106 is picking an item from a container 10 located on the first side of robot 100, then it would be desirable to transition only the first drop guard to the expanded condition, while maintaining the second drop guard in the stowed condition, so that the second drop guard does not interfere with order fulfilment tasks being performed by other robots.

Each drop guard 188 includes an actuator (not shown) and a cover 192. The actuator is arranged to pivot, translate, or otherwise move cover 192 between the stowed and expanded conditions. That is, the actuator converts energy from an energy source into movement of cover 192 to transition drop guards 188 between the stowed and expanded conditions. In one example, the actuator may be configured to convert compressed air into movement of the cover. In certain instances, the compressed air is obtained from pneumatic system 38. In other instances, the pneumatic supply may be provided by a the high-pressure, onboard, air tank. In further instances, the drop guards 188 may be stowed and expanded electronically, using a servo motor or another electronic drive device.

Cover 192 may be formed of any material, for example, plastics, metals, textiles, composite materials, or a combination thereof, and configured to deflect a dropped item towards storage containers 10 or catch the dropped item (e.g., secure the item to cover 192). As a result, the item may be subsequently grasped by the end effector 108 of robot 100.

In some embodiments, when drop guard 188 is in the expanded condition, cover 192 extends downwards from an end of the drop guard attached to body 102 and towards a free end of the drop guard (e.g., opposite the attached end). In this regard, cover 192 is designed to deflect drop items back into the storage container from which the item was picked. In other embodiments, cover 192 may extend generally horizontally when drop guard 188 is the expanded condition to "catch" or otherwise capture dropped items. Still, in other embodiments, cover 192 may extend slightly upwards to cause the item to slide, roll, or otherwise fall into an order container secured to grapple 172.

Although drop guards 188 are primarily described herein as part of robot 100, collapsible and expandable drop guards may additionally, or alternatively, be coupled to frame 14 to open and close gap 18. For example, frame 14 may include similarly constructed drop guards having a naturally closed condition that covers gap 18 and prevents items from falling into the gap. When it is desirable to lift one or more containers 10 from a stack 12, the drop guards may be opened, permitting grapple 172 to be lowered into the gap and about the stack of containers.

A pick and pack operation will now be described with reference to FIGS. 3A-4B. Upon receiving instructions to pick and pack an item, the wheels of wheel assembly 104 may be pivoted to navigate the body 102 of robot 100 along rails 22 to a desired location on grid 26. For example, if the desired item is housed in a storage container located at the top of a stack 12, wheel assembly 104 may drive along rails 22 to position the grapple 172 holding an order container above a grid space located directly lateral to the grid space within which the item is stored. Once in position, the coupler 130 of robot 100 may engage with and transition valve 50 from the closed condition to the open condition, thereby allowing an external pneumatic supply (e.g., compressed air) to flow from pneumatic system 38 into the robot. The compressed air may be used to transition drop guard 188, located on the side of robot 100 facing the storage container holding the desired item, from the stowed condition to the expanded condition.

Once drop guard 188 is expanded, end effector 108 (e.g., suction cup) may be positioned within the storage container and the compressed air may be used to grasp the item. After the item has been grasped, picking arm 106 may be moved toward the order the container to pack the item. If the item is unintentionally dropped before it is packed into the order container, the item will either be deflected back into the storage container from which it was picked, or captured by drop guard 188, but the item will not fall into gap 18. In either scenario, the item that was dropped may be subsequently grasped again by the end effector 108 of robot 100 and packed within the order container.

On the other hand, if the desired item is stacked underneath other containers, the container housing the desired item (e.g., the "target container") must first be extracted. To extract the target container, robot 100 moves along rails 22 to position a container retrieval device 168 over the stack 12 housing the target container. Grapple 172 may then be lowered into gap 18 and around stack 12 until the grapple is positioned around the container nested within the target container. With grapple 172 in position, flaps 182 may be deployed and brought into engagement with a rib, or another engagement feature, on a side of the container to secure the container to the grapple. With container 10 secured to grapple 172, the winding mechanism may be wound to retract grapple 172 and to lift the container and any containers stacked on top of that container. The body 102 of robot 100 may then be moved to another location and each of the containers secured by grapple 172 may be temporarily placed on top of another stack. The container retrieval device 168 may then be used to extract the target container. With the extracted target container secured to grapple 172, the picking arm 106 may pick the item from the target container, move about a lateral side of body 102 having drop guard 188 in the expanded condition and pack the picked item into the order container. It will be appreciated that expanded drop guard 188 will prevent the item from falling into gap 18 in the event that the item is unintentionally dropped before the item is packed into the order container.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A robot, comprising:
   a body coupled to a wheel assembly, the wheel assembly including a plurality of wheels arranged to move the body along a first set of parallel rails extending in a first direction and a second set of parallel rails extending in a second direction perpendicular to the first direction;
   a picking arm having an end effector for picking items from a storage container; and
   at least one drop guard, wherein at least a portion of the at least one drop guard is laterally movable from a stowed condition to an expanded condition.

2. The robot of claim 1, wherein when the at least one drop guard is in the stowed condition, a free end of the at least one drop guard extends a first lateral distance from the body, and when the at least one drop guard is in the expanded condition, the free end of the at least one drop guard extends a second lateral distance from the body greater than the first lateral distance.

3. The robot of claim 1, wherein the at least one drop guard includes a first drop guard located on a first side of the body and a second drop guard located on a second side of the body opposite the first side of the body.

4. The robot of claim 3, wherein the first drop guard is actuatable independent of the second drop guard.

5. The robot of claim 1, wherein the at least one drop guard comprises a cover arranged to capture dropped items.

6. The robot of claim 1, wherein the at least one drop guard is pneumatically actuated between the stowed condition and the expanded condition.

7. The robot of claim 1, wherein the at least one drop guard is electronically actuated between the stowed condition and the expanded condition.

8. A system, comprising:
   a storage frame including pillars defining shafts, the pillars supporting a first set of a parallel rails extending in a first direction and a second set of parallel rails extending in a second direction perpendicular to the first direction, the first and second sets of parallel rails collectively defining a plurality of grid spaces;
   containers stacked upon one another to form a plurality of vertical stacks, each vertical stack being arranged within a footprint of a respective one of the plurality of grid spaces; and
   a robot comprising:
   a body coupled to a wheel assembly, the wheel assembly including a plurality of wheels arranged to move the body along the first set of parallel rails and the second set of parallel rails;
   a picking arm equipped with an end effector for picking items from one of the containers; and
   a drop guard movable between a stowed condition and an expanded condition.

9. The system of claim 8, wherein a dimension of the containers is smaller than a dimension of the shafts such that a gap exists between the vertical stacks and the pillars.

10. The system of claim 9, wherein the robot further comprises a grapple sized to descend within the gap and arranged to secure and lift at least one of the containers.

11. The system of claim 10, wherein the grapple is coupled to a winding mechanism supported by a pair of support arms of the body, and the drop guard extends at least partially along a side of the body.

12. The system of claim 9, wherein when the drop guard is in the expanded condition, at least a portion of the drop guard is disposed above the gap of a grid space located laterally adjacent to the robot.

13. The system of claim 8, wherein when the drop guard is in the stowed condition, the drop guard does not extend above a grid space located laterally adjacent to the robot.

14. The system of claim 8, wherein the drop guard is pivotable between the stowed condition and the expanded condition.

15. The system of claim 8, wherein the storage frame includes a supply line arranged to provide the robot with an external pneumatic supply.

16. The system of claim 15, wherein a valve is housed within at least one of the first set of parallel rails or the second set of parallel rails, the valve being transitionable between a closed condition in which the external pneumatic supply is confined within the supply line and an open condition in which the external pneumatic supply is accessible by the robot.

17. The system of claim 16, wherein the robot further comprises a coupler arranged to selectively engage the valve and access the external pneumatic supply.

18. The system of claim 17, wherein the robot further comprises a high-pressured air tank configured to store compressed air received from the supply line at or above approximately 3000 psi.

19. The system of claim 8, wherein the drop guard is pneumatically actuated between the stowed condition and the expanded condition.

20. A system, comprising:
   a storage frame including pillars defining shafts, the pillars supporting a first set of a parallel rails extending in a first direction and a second set of parallel rails extending in a second direction perpendicular to the first direction, the first and second sets of parallel rails collectively defining a grid having a plurality of grid spaces, the grid being configured to support a mobile manipulator robot;
   containers stacked upon one another to form a plurality of vertical stacks, each vertical stack being arranged within a footprint of a respective one of the plurality of grid spaces such that a gap exists between a respective vertical stack and the pillars defining the respective one of the plurality of grid spaces; and a drop guard coupled to the storage frame, the drop guard being transitionable between a collapsed condition in which the gap is exposed and an expanded condition in which the gap is covered from above.

* * * * *